United States Patent
Yoshida et al.

(10) Patent No.: US 9,719,038 B2
(45) Date of Patent: Aug. 1, 2017

(54) GASIFIER START-UP METHOD, GASIFIER, AND INTEGRATED GASIFICATION COMBINED CYCLE FACILITY

(71) Applicant: MITSUBISHI HEAVY INDUSTRIES, LTD., Tokyo (JP)

(72) Inventors: Shogo Yoshida, Tokyo (JP); Katsuhiko Yokohama, Tokyo (JP); Keisuke Matsuo, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 435 days.

(21) Appl. No.: 14/174,266

(22) Filed: Feb. 6, 2014

(65) Prior Publication Data
US 2014/0223820 A1    Aug. 14, 2014

(30) Foreign Application Priority Data
Feb. 13, 2013   (JP) .................................. 2013-025410

(51) Int. Cl.
  *F01K 5/02*   (2006.01)
  *C10J 3/00*   (2006.01)
  (Continued)

(52) U.S. Cl.
  CPC ................. *C10J 3/726* (2013.01); *F01K 5/02* (2013.01); *C10J 2300/093* (2013.01);
  (Continued)

(58) Field of Classification Search
  CPC .................. C10J 3/726; C10J 2300/093; C10J 2300/094; C10J 2300/0956; C10J 2300/0959; C10J 2300/1678
  See application file for complete search history.

(56) References Cited

U.S. PATENT DOCUMENTS

| | | | |
|---|---|---|---|
| 4,881,949 A | 11/1989 | Briingel et al. | |
| 2008/0134658 A1* | 6/2008 | Yoshida | F01K 23/068 60/39.12 |

(Continued)

FOREIGN PATENT DOCUMENTS

| | | |
|---|---|---|
| CN | 1049024 | 2/1991 |
| CN | 102245744 | 11/2011 |

(Continued)

OTHER PUBLICATIONS

Office Action issued Jul. 20, 2015 in corresponding Chinese patent application No. 201410040110.0 (with English translation).

(Continued)

*Primary Examiner* — Matthew Merkling
(74) *Attorney, Agent, or Firm* — Wenderoth, Lind & Ponack, L.L.P.

(57) ABSTRACT

A gasifier start-up method for a gasifier capable of preventing or inhibiting a temporary occurrence of black smoke when a gasifier is started-up. A gasifier start-up method for a gasifier, in which a gasifying agent and a solid carbonaceous fuel are supplied and gasified, includes a start-up burner igniting step of supplying a start-up fuel and oxygen-containing gas to a start-up burner and igniting the start-up fuel and oxygen-containing gas, under an inert atmosphere in which an inside of the gasifier around the start-up burner is filled with inert gas; and an oxygen-containing-gas supply adjusting step of adjusting the supply of the oxygen-containing gas such that combustion gas obtained after the combustion reaction of the start-up fuel and the oxygen-containing gas becomes the inert gas, which contains little oxygen.

4 Claims, 2 Drawing Sheets

(51) Int. Cl.

| | |
|---|---|
| *C10J 3/72* | (2006.01) |
| *C10K 1/02* | (2006.01) |
| *F01K 23/10* | (2006.01) |
| *F01K 23/16* | (2006.01) |
| *F22B 1/18* | (2006.01) |

(52) U.S. Cl.
CPC .. *C10J 2300/094* (2013.01); *C10J 2300/0956* (2013.01); *C10J 2300/0959* (2013.01); *C10J 2300/1653* (2013.01); *C10J 2300/1678* (2013.01); *C10K 1/026* (2013.01); *F01K 23/10* (2013.01); *F01K 23/16* (2013.01); *F22B 1/1815* (2013.01); *Y02E 20/16* (2013.01); *Y02E 20/18* (2013.01)

(56) References Cited

U.S. PATENT DOCUMENTS

| | | | |
|---|---|---|---|
| 2012/0267575 A1* | 10/2012 | Abughazaleh | C01B 3/24 252/373 |
| 2013/0112543 A1 | 5/2013 | Mizokoshi et al. | |
| 2014/0223820 A1 | 8/2014 | Yoshida et al. | |

FOREIGN PATENT DOCUMENTS

| | | |
|---|---|---|
| JP | 61-233083 | 10/1986 |
| JP | 62-182443 | 8/1987 |
| JP | 1-53719 | 11/1989 |
| JP | 4-7174 | 1/1992 |
| JP | 4-20591 | 1/1992 |
| JP | 10-251671 | 9/1998 |
| JP | 2002-249785 | 9/2002 |
| JP | 2006-152081 | 6/2006 |
| JP | 2012-167615 | 9/2012 |
| JP | 2014-152300 | 8/2014 |
| WO | 02/46331 | 6/2002 |
| WO | 2010/014456 | 2/2010 |
| WO | 2012/073300 | 6/2012 |

OTHER PUBLICATIONS

Decision to Grant a Patent issued Aug. 11, 2015 in corresponding Japanese patent application No. 2014-158566, which is a divisional application from Japanese patent application No. 2013-025410.
International Search Report issued in International Application No. PCT/JP2015/069181 on Aug. 18, 2015 (with English translation).
Written Opinion of the International Searching Authority issued in International Application No. PCT/JP2015/069181 on Aug. 18, 2015 (with English translation).
Decision to Grant a Patent issued Sep. 2, 2014 in corresponding Japanese patent application No. 2013-025410.
Office Action issued Jun. 3, 2014 in corresponding Japanese patent application No. 2013-025410 (with English translation).
Shozo Kaneko et al., "Current Status on Development of Air Blown Two-Stage Entrained Flow Coal Gasifier", Mitsubishi Heavy Industries, Ltd., Technical Review, vol. 33, No. 3, Oct. 1996.

* cited by examiner

GASIFIER START-UP METHOD, GASIFIER, AND INTEGRATED GASIFICATION COMBINED CYCLE FACILITY

CROSS-REFERENCE TO RELATED APPLICATIONS

This application is based on Japanese Patent Application No. 2013-025410, the contents of which are incorporated herein by reference.

BACKGROUND OF THE INVENTION

1. Technical Field

The present invention relates to a start-up method for a gasifier applied to an integrated gasification combined cycle facility (IGCC), for example, and relates particularly to a flare system for the gasifier.

2. Description of the Related Art

An integrated gasification combined cycle facility (IGCC) is a power generation facility that aims for higher efficiency and higher environmental cleanliness than conventional coal-fired power generation by gasifying coal and by being combined with combined cycle power generation. This integrated gasification combined cycle facility has the great advantage that coal, which is a resource in great abundance, can be used, and this advantage becomes even greater by increasing the number of coal types that can be used.

A conventional integrated gasification combined cycle facility generally consists of coaling equipment, a coal gasifier, a char recovery unit, a gas purification facility, a gas turbine facility, a steam turbine facility, and a heat recovery steam generator. Therefore, coal (pulverized coal) is supplied to the coal gasifier from the coaling equipment, and a gasifying agent (air, oxygen-enriched air, oxygen, or water vapor) is taken into the coal gasifier.

In the coal gasifier, the coal is combusted to be gasified, thus generating combustible gas (coal gas). Then, the generated combustible gas is purified after an unreacted component (char) of the coal is removed in the char recovery unit, and is then supplied to the gas turbine facility.

The combustible gas supplied to the gas turbine facility is combusted as a fuel in the combustor, thereby generating high-temperature high-pressure combustion gas, and the gas turbine of the gas turbine facility is driven upon receiving a supply of this combustion gas.

In the heat recovery steam generator, heat energy is recovered from exhaust gas that is discharged after driving the gas turbine, thus generating steam. This steam is supplied to the steam turbine facility, and the steam turbine is driven by this steam. Therefore, power can be generated by a generator that uses the gas turbine and the steam turbine as driving sources.

On the other hand, the exhaust gas from which the heat energy has been recovered in the heat recovery steam generator is emitted to the atmosphere via a stack.

In the above-described integrated gasification combined cycle facility, a coal gasifier start-up process includes the following steps (1) to (9).

Specifically, a general coal gasifier start-up process is performed in the following order: (1) nitrogen gas ($N_2$) purging in the gasifier; (2) pressurizing/warming in the gasifier; (3) ignition in the gasifier by supplying air and an auxiliary fuel; (4) supplying gas into the porous filter; (5) ramping (pressurization); (6) supplying the gas into the gas purification facility; (7) switching the gasifier fuel from the auxiliary fuel to coal; (8) switching the gas turbine fuel; and (9) increasing the load.

Note that the above-described process is used for air blown gasification; however, Steps (1) to (7) in the above-described process are used also for a chemical composition plant using oxygen blown gasification.

In such a start-up process, examples of the auxiliary fuel used at the time of ignition in the gasifier in Step (3) include, for example, kerosene, light oil, and natural gas.

Furthermore, in the gas-turbine-fuel switching step (7), a start-up fuel (for example, kerosene or light oil) that is used at the time of start-up during which the supply of coal gas cannot be received is changed to coal gas generated in the gasifier.

Japanese Unexamined Patent Application, Publication No. Sho 62-182443 describes a technology in which, when the integrated gasification combined cycle facility is started-up, a gasifier and a gas purifying device are warmed while combusting exhaust gas in a flare stack (flare facility), until the gas composition and pressure are stabilized, and combustion can be performed in the gas turbine. JP 62-182443 also describes that a smoke emission treatment facility for a flare stack is required at a location with strict environmental conditions.

Furthermore, Japanese Unexamined Patent Application, Publication No. 2006-152081 discloses a coal gasification plant in which a bypass line that branches at an upstream side of a dust removal device and that reaches the flare stack is provided in a main system line connecting the coal gasifier and the dust removal device.

SUMMARY OF THE INVENTION

1. Technical Problem

In the above-described start-up process, because nitrogen gas is supplied during Steps (1) and (2), for example, the nitrogen gas, with a purity of 99 vol %, contains little oxygen ($O_2$). However, at the time of ignition in the gasifier in Step (3), combustion exhaust gas containing residual oxygen (hereinafter, also referred to as "oxygen-containing gas") is produced at least at the beginning of ignition in the gasifier.

Note that the reason why the combustion exhaust gas containing residual oxygen is produced "at least at the beginning of ignition in the gasifier" is because gas containing little oxygen is supplied again to the porous filter in Step (4) and the subsequent steps.

Therefore, when this combustion exhaust gas is supplied to the porous filter for the purpose of dust removal, unburned combustibles (hereinafter, referred to as "char") existing in a filter element are combusted, and combustion heat thereof causes an excessive increase in the temperature of the filter element.

Such an excessive increase in the temperature of the filter element causes an excessive design temperature of the material or damage thereto; therefore, at the beginning of ignition in the gasifier, gas needs to be treated in the flare system while bypassing at least the porous filter. Note that a general bypass passage branches from a pipe passage connecting a gasifier outlet and a cyclone, at an upstream side of a cyclone inlet, as disclosed in JP 2006-152081, for example.

However, in a gasifier ignition step in the above-described method (process), there is concern that char remaining in the gasifier and the pipe will be discharged, even though temporarily, from the stack of the flare facility in the form of black smoke. Such discharge of black smoke is not desirable even though it is temporary. Therefore, it is desirable to prevent or inhibit a temporary occurrence of black smoke when the gasifier is started-up.

The present invention has been made in order to solve the above-described problems, and an object thereof is to provide a gasifier start-up method with which a temporary occurrence of black smoke when the gasifier is started-up can be prevented or inhibited. In other words, an object of the present invention is to prevent char from being discharged from the flare facility via a passage bypassing a filter, while not supplying the porous filter with oxygen-containing gas produced when the gasifier is started-up.

2. Solution to the Problem

In order to solve the above-described problems, the present invention employs the following solutions.

A first aspect of the present invention is a gasifier start-up method for a gasifier in which a gasifying agent and a solid carbonaceous fuel are supplied and gasified, the start-up method including: a start-up burner igniting step of supplying a start-up fuel and oxygen-containing gas to a start-up burner and igniting the start-up fuel and the oxygen-containing gas in the gasifier under an inert atmosphere.

According to this gasifier start-up method, the start-up method includes the start-up burner igniting step of supplying the start-up fuel and the oxygen-containing gas to the start-up burner and igniting the start-up fuel and the oxygen-containing gas, in the gasifier under the inert atmosphere; therefore, it is possible to prevent or significantly inhibit oxygen from being produced at the time of start-up. Specifically, at the beginning of ignition in the gasifier, the occurrence of combustion exhaust gas containing residual oxygen can be prevented or inhibited. As a result, char, which causes black smoke, is removed, thus making it possible to supply gas to the porous filter in the same way as the normal operation.

In this case, it is preferred that the air ratio in the start-up burner igniting step under the inert atmosphere fall within a range from 0.7 to 1.1, and it is more preferred that the air ratio be 1. Note that, if the air ratio is smaller than 1, soot generation and carbon monoxide generation are increased, and thus the lower limit of the air ratio is set to 0.7, and, if the air ratio is larger than 1, oxygen generation is increased, and thus the upper limit of the air ratio is set to 1.1.

A second aspect of the present invention is a gasifier start-up method for a gasifier in which a gasifying agent and a solid carbonaceous fuel are supplied and gasified, the start-up method including an oxygen-level reducing step of reducing the level of oxygen in gas to an ignition limit or lower by mixing inert gas into combustible gas generated in the gasifier, at an upstream side of a char recovery unit.

According to this gasifier start-up method, the start-up method includes the oxygen-level reducing step of reducing the level of oxygen in gas to the ignition limit or lower by mixing inert gas into combustible gas generated in the gasifier, at an upstream side of the char recovery unit; therefore, it is possible to prevent char from being combusted even though the gas is supplied to the porous filter. Specifically, char, which causes black smoke, is removed, thus making it possible to supply the gas to the porous filter in the same way as the normal operation.

A third aspect of the present invention is a gasifier in which a gasifying agent and a solid carbonaceous fuel are supplied and gasified, the gasifier including: a gas supplying passage that guides generated combustible gas to a char recovery unit; an inert gas supplying passage that has an inert-gas flow control valve supplying inert gas to the gasifier provided with a start-up burner; an oxygen supplying passage that has an oxygen flow control valve supplying oxygen to the gasifier; an air supply passage that has an airflow control valve supplying air to the gasifier; and a flow control unit for the inert-gas flow control valve, the oxygen flow control valve, and the airflow control valve, in which the flow control unit performs flow control so as to supply an amount of oxygen that allows the level of oxygen in gas to be reduced to an ignition limit or lower.

According to this gasifier, the gasifier includes: the gas supplying passage, which guides generated combustible gas to the char recovery unit; the inert gas supplying passage, which has an inert gas on-off valve supplying inert gas to the gasifier provided with the start-up burner; the oxygen supplying passage, which has an oxygen on-off valve supplying oxygen to the gasifier; the air supply passage, which has an air on-off valve supplying air to the gasifier; and the flow control unit for the inert gas on-off valve, the oxygen on-off valve, and the air on-off valve. The flow control unit performs flow control so as to supply an amount of oxygen that allows the level of oxygen in gas to be reduced to an ignition limit or lower. Therefore, while placing the gasifier around the start-up burner under the inert atmosphere, the start-up fuel and the oxygen-containing gas can be supplied to the start-up burner and ignited. As a result, when the gasifier is started-up, the occurrence of oxygen can be prevented or significantly inhibited. Specifically, at the beginning of ignition in gasifier, the occurrence of combustion exhaust gas containing residual oxygen can be prevented or inhibited. As a result, char, which causes black smoke, is removed, thus making it possible to supply gas to the porous filter in the same way as the normal operation.

A fourth aspect of the present invention is a gasifier in which a gasifying agent and a solid carbonaceous fuel are supplied and gasified, the gasifier including: a gas supplying passage that guides generated combustible gas to a char recovery unit; and an oxygen level adjusting section that supplies inert gas to the gas supplying passage.

According to this gasifier, because the gas supplying passage, which guides generated combustible gas to the char recovery unit, and the oxygen level adjusting section, which supplies inert gas to the gas supplying passage, are included, it is possible to reduce the level of oxygen in gas to the ignition limit or lower by mixing inert gas into the combustible gas generated in the gasifier, at an upstream side of the char recovery unit. As a result, when the gasifier is started-up, it is possible to prevent char from being combusted even though the gas is supplied to the porous filter. Specifically, char, which causes black smoke, is removed, thus making it possible to supply the gas to the porous filter in the same way as the normal operation.

A fifth aspect of the present invention is an integrated gasification combined cycle facility in which a gas turbine facility is driven to generate power by using, as a fuel, combustible gas obtained by gasifying coal in a gasifier according to the third or fourth aspect, and a steam turbine is driven to generate power by using steam generated by recovering heat from combustion exhaust gas discharged from the gas turbine facility.

According to this integrated gasification combined cycle facility of the present invention, combustible gas obtained after coal is gasified in the gasifier according to the third or fourth aspect is used as a fuel; therefore, particles, such as char, which causes black smoke, contained in gas generated until combustible gas having a desired property is obtained, in the start-up of the gasifier, are removed before the gas is treated in the flare facility.

3. Advantageous Effects of the Invention

According to the above-described present invention, it is possible to provide a gasifier capable of preventing or inhibiting black smoke from temporarily occurring when the gasifier is started-up. Specifically, because char can be removed by supplying gas obtained after the level of oxygen in the gas generated from the gasifier is reduced to an ignition limit or lower, to the porous filter and an existing dust collecting facility, the temporary occurrence of black smoke can be prevented or inhibited even in the operation performed when the gasifier is started-up.

DETAILED DESCRIPTION OF THE INVENTION

A gasifier start-up method, a gasifier, and an integrated gasification combined cycle facility according to one embodiment of the present invention will be described below with reference to the drawings.

A gasifier, to be described below, is used for equipment in which pulverized coal is injected into the gasifier to generate combustible gas (coal gas), in an integrated gasification combined cycle facility (hereinafter, referred to as "IGCC") 1 shown in FIG. 1, for example. Note that, although an example coal gasifier 10 that generates combustible gas from pulverized coal will be described below, the gasifier of the present invention can also be used to gasify other solid carbonaceous fuels, for example, biomass fuels, such as thinnings, scrap wood, driftwood, grass, waste, sludge, and tires.

Figure 1:
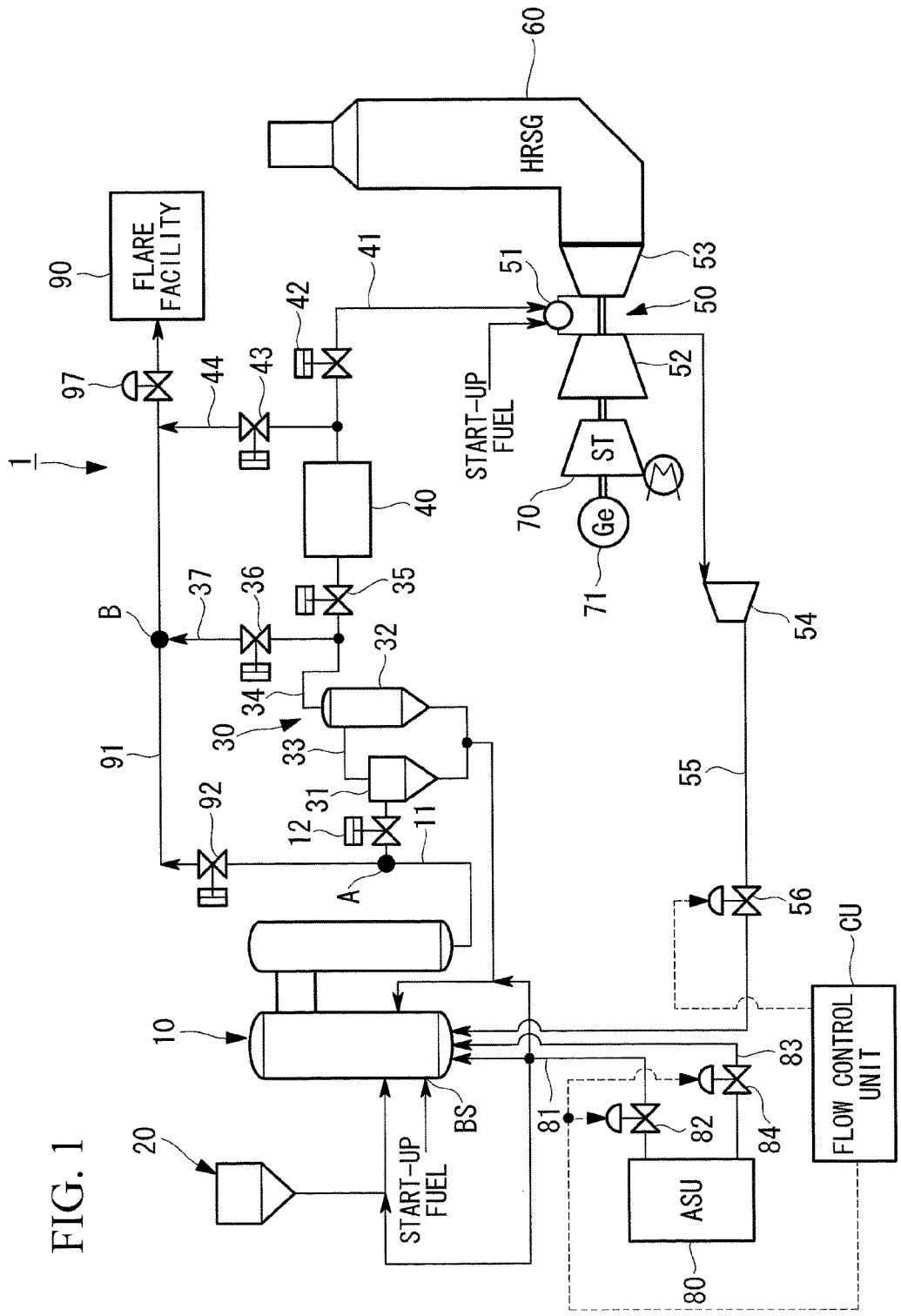
FIG. 1 is a system diagram showing a gasifier start-up method and showing, in outline, an example configuration of an integrated gasification combined cycle facility (IGCC) provided with a gasifier according to a first embodiment of the present invention.

The IGCC 1 of the first embodiment, whose configuration is shown in outline in FIG. 1, includes, as main components, coaling equipment 20 that supplies pulverized coal, which is a fuel; the coal gasifier 10 that gasifies the pulverized coal supplied together with a gasifying agent, thus generating combustible gas; a char recovery unit 30 that separates and recovers char exhausted together with the combustible gas; a gas purification facility 40 that purifies the combustible gas to remove impurities from the gas; a gas turbine facility 50 that is operated using the purified combustible gas as a fuel; a heat recovery steam generator (HRSG) 60 that recovers heat of high-temperature combustion exhaust gas discharged from the gas turbine facility 50 to generate steam; and a steam turbine facility 70 that is operated using the steam supplied from the heat recovery steam generator 60.

As the coal gasifier 10, a gasifier called an air-blown two-stage entrained flow gasifier, for example, is adopted. The gasifier 10 has a two-stage configuration consisting of a combustor portion (high-air-ratio portion) in which high-temperature combustion allowing stable ash melting is obtained and a reductor portion (low-air-ratio portion) in which the gasification reaction is performed by utilizing high-temperature gas from the combustor portion, and is equipment for gasifying pulverized coal, which is a solid carbonaceous fuel, introduced together with a gasifying agent. Then, combustible gas generated in the gasifier 10 is guided to the char recovery unit 30, to be described later, via a combustible gas supplying system (gas supplying passage) 11.

Examples of the gasifying agent used here include air, oxygen-enriched air, oxygen, and water vapor. For example, oxygen supplied from an air separation unit (ASU) 80 is mixed into compressed air guided from the gas turbine facility 50 and is used.

The air separation unit 80 and the combustor portion of the gasifier 10 are connected by an inert gas supplying passage 81 and an oxygen supplying passage 83. The inert gas supplying passage 81 is a pipe passage for supplying nitrogen gas (inert gas) obtained in the air separation unit 80 to the combustor portion, and an inert-gas flow control valve 82 is provided in the passage.

Furthermore, the oxygen supplying passage 83 is a pipe passage for supplying oxygen gas obtained in the air separation unit 80 to the combustor portion, and an oxygen flow control valve 84 is provided in the passage.

Furthermore, the combustor portion is connected to an air supply passage 55 through which compressed air extracted as a gasifying agent is supplied from a compressor 52 of the gas turbine facility 50, to be described later. An airflow control valve 56 is provided in the air supply passage 55.

The above-described inert-gas flow control valve 82, oxygen flow control valve 84, and airflow control valve 56 are provided with a flow control unit CU for controlling their flow rates. At the time of ignition in the gasifier, the flow control unit CU performs flow control by opening the inert-gas flow control valve 82 and also performs control by closing the oxygen flow control valve 84 and the airflow control valve 56.

Combustible gas generated in the above-described coal gasifier 10 is guided to the char recovery unit 30 while containing char. The char recovery unit 30 has a configuration in which a cyclone 31 and a porous filter 32 are connected in series via a connecting pipe 33, and a combustible gas component from which particles are separated and removed in the cyclone 31, which is disposed at an upstream side, is guided to the porous filter 32. Note that the porous filter 32 is disposed at a downstream side of the cyclone 31 and recovers fine char in the combustible gas.

The combustible gas from which char has been separated and removed in the char recovery unit 30 is guided to the gas purification facility 40 via a combustible gas supplying system 34. In the gas purification facility 40, the combustible gas is purified to remove impurities, thus making the combustible gas have properties suitable for use as fuel gas for the gas turbine facility 50.

The combustible gas (fuel gas) generated in the gas purification facility 40 is supplied to a combustor 51 of the gas turbine facility 50 via a combustible gas supplying system 41 and is combusted using compressed air introduced from the compressor 52.

When the combustible gas is combusted in this way, high-temperature high-pressure combustion gas is generated and supplied from the combustor 51 to a gas turbine 53. As a result, the high-temperature high-pressure combustion gas performs work to drive the gas turbine 53, and high-temperature combustion exhaust gas is discharged. Then, the shaft output of the gas turbine 53 is used as a driving source for a generator, to be described later, and the compressor 52.

Note that the compressed air supplied from the compressor 52 is not only supplied to the combustor 51 for combusting the combustible gas but is also used as a gasifying agent in the coal gasifier 10 after partially being extracted and raised in pressure in an extracted-air booster 54 and passing through the air supply passage 55.

The combustion exhaust gas that has performed work in the gas turbine 53 is guided to the heat recovery steam generator 60. The heat recovery steam generator 60 is a facility for generating steam by recovering heat of the combustion exhaust gas. Specifically, in the heat recovery steam generator 60, steam is generated through heat exchange between the combustion exhaust gas and water, the generated steam is supplied to the steam turbine 70, and the combustion exhaust gas that has been reduced in temperature is emitted to the atmosphere after being subjected to necessary processing.

The gas turbine 53 and the steam turbine 70, which are driven in this way, serve as driving sources that drive a coaxial generator 71, for example, to generate power. Note that the gas turbine 53 and the steam turbine 70 may drive their own generators, and the structures thereof are not particularly limited thereto.

In the start-up process performed to start up the IGCC 1 having the above-described configuration, at the time of nitrogen gas purging in the gasifier in Step (1) and pressurizing/warming in the gasifier in Step (2), which are described in the conventional technology, for example, nitrogen gas with a purity of 99 vol % is supplied from the air separation unit 80. Thus, high-purity nitrogen gas that contains little oxygen ($O_2$) is supplied to the porous filter 32.

However, at the time of ignition in the gasifier in Step (3), at least at the beginning of the ignition in the coal gasifier 10, combustion exhaust gas that contains residual oxygen and that is not suitable for use as combustible gas is produced. When passing through the porous filter 32 for the purpose of dust removal, this combustion exhaust gas burns char remaining in a filter element. Therefore, in conventional equipment, a bypass main passage 91 of a bypass pipeline that bypasses the char recovery unit 30 and that reaches a flare facility 90 is provided.

The bypass main passage 91 is a gas passage that branches from the combustible gas supplying system 11 at an upstream side of the inlet of the cyclone 31 and that reaches the flare facility 90, and passage-switching on-off valves 12 and 92 are provided in both passages that branch from the combustible gas supplying system 11.

Furthermore, the above-described bypass main passage 91 is connected to a branch pipe 37 that branches from the combustible gas supplying system (gas supplying passage) 34, which connects the porous filter 32 and the gas purification facility 40, at an upstream side of an on-off valve 35 and that is provided with an on-off valve 36 at a downstream side of the branching position and a branch pipe 44 that branches from the combustible gas supplying system (gas supplying passage) 41, which connects the gas purification facility 40 and the combustor 51, at an upstream side of an on-off valve 42 and that is provided with an on-off valve 43 at a downstream side of the branching position.

Furthermore, the passage inlet on-off valve 12 is provided in the combustible gas supplying system 11 at a place on a downstream side of the branching position of the bypass main passage 91 and on an upstream side of the inlet of the cyclone 31.

In the thus-configured gasifier 10, in the start-up process performed to start up the IGCC 1, after the nitrogen gas purging in the gasifier in Step (1) using nitrogen gas and the pressurizing/warming in the gasifier in Step (2), the process flow advances to Step (3), where ignition in the gasifier is performed. At the time of ignition in the gasifier, an auxiliary fuel, such as kerosene, light oil, or natural gas, is used as a start-up fuel, and a sufficient amount of oxygen-containing gas for complete combustion is supplied; however, at the beginning of ignition in the coal gasifier 10, combustion exhaust gas that contains residual oxygen and that is not suitable for use as combustible gas is produced.

Therefore, at the time of start-up ignition in the coal gasifier 10, which generates combustible gas by gasifying pulverized coal introduced together with a gasifying agent, the following start-up method is adopted.

Specifically, a gasifier start-up method including a start-up burner igniting step in which a start-up fuel and oxygen-containing gas are supplied to a start-up burner BS and are ignited, in the gasifier under an inert atmosphere.

In the start-up burner igniting step, in a combustor portion 10C under the inert atmosphere, a start-up fuel is supplied to the start-up burner BS together with oxygen-containing gas and is ignited. At this time, because the start-up fuel is ignited by using oxygen in the oxygen-containing gas, even if the periphery is under the inert atmosphere, ignition is not interfered with.

Note that, when the start-up fuel is ignited under the inert atmosphere, it is preferable that natural gas (LNG), having particularly good ignition performance, be adopted as the start-up fuel.

This gasifier start-up method is made possible by providing a configuration that includes the gas supplying passage 11, which guides generated combustible gas to the char recovery unit 30; the inert gas supplying passage 81, which has the inert-gas flow control valve 82 supplying nitrogen gas to the combustor portion provided with the start-up burner BS; the oxygen supplying passage 83, which has the oxygen flow control valve 84 supplying oxygen to the combustor portion; the air supply passage 55, which has the airflow control valve 56 supplying air to the combustor portion; and the control unit CU for the inert-gas flow control valve 82, the oxygen flow control valve 84, and the airflow control valve 56.

At the time of ignition in the gasifier, the above-described flow control unit CU performs flow control by opening the inert-gas flow control valve 82 and performs control by closing the oxygen flow control valve 84 and the airflow control valve 56.

According to this gasifier start-up method, because the supply of oxygen-containing gas is adjusted such that the combustion gas obtained after the combustion reaction of the start-up fuel and oxygen-containing gas becomes inert gas that contains little oxygen, it is possible to prevent or significantly inhibit oxygen from being produced at the time of start-up. Specifically, at the beginning of ignition in the gasifier, ignition is performed with little extra oxygen, thus making it possible to prevent or inhibit the occurrence of combustion exhaust gas containing residual oxygen. As a result, char, which causes black smoke, is removed, thus making it possible to supply gas to the porous filter 32 in the same way as the normal operation.

In this case, a desirable air ratio in the start-up burner igniting step under the inert atmosphere falls within a range from 0.7 to 1.1, and a more desirable air ratio is 1. This is because, if the air ratio is smaller than 1, soot generation and carbon monoxide generation are increased, and thus the lower limit of the air ratio is set to 0.7, and, if the air ratio is larger than 1, oxygen generation is increased due to an increase in the amount of extra oxygen, and thus the upper limit of the air ratio is set to 1.1.

In this way, at the time of ignition in the coal gasifier 10, if combustible gas (oxygen-containing gas) can be supplied to the porous filter 32, char in the gas can be removed with the porous filter 32, and therefore, the pipe passage of the bypass main passage 91 from point A to point B is unnecessary. Specifically, not only the pipe passage of the bypass main passage 91 from the point A to the point B but also the passage inlet on-off valve 92 and a dust collector 93 are unnecessary, and furthermore, the passage inlet on-off valve 12 in the combustible gas supplying system 11 is also unnecessary.

Figure 2:
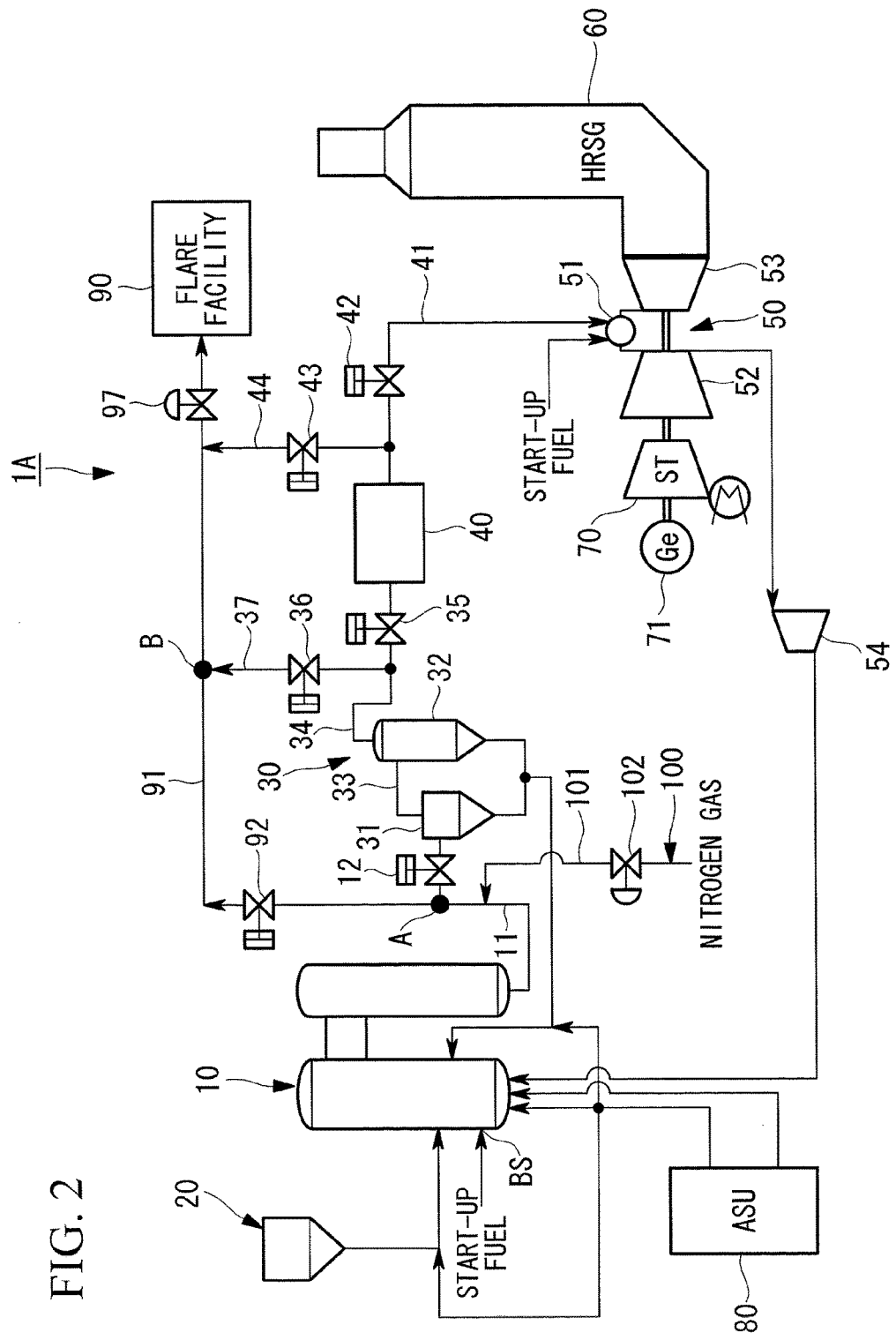
FIG. 2 is a system diagram showing a gasifier start-up method and showing, in outline, an example configuration of an integrated gasification combined cycle facility (IGCC) provided with a gasifier according to a second embodiment of the present invention.

Next, an IGCC 1A according to a second embodiment will be described with reference to an example configuration shown in outline in FIG. 2. Note that identical reference symbols are assigned to the same components as those of the above-described embodiment, and a detailed description thereof will be omitted.

In the IGCC 1A shown in the figure, the gasifier 10 includes the gas supplying passage 11, which guides generated combustible gas to the char recovery unit 30, and an oxygen level adjusting section 100 that supplies nitrogen gas (inert gas) to the gas supplying passage 11. The oxygen level adjusting section 100 shown in the figure includes a nitrogen-gas supplying pipe 101 that connects the gas supplying passage 11 and a nitrogen-gas supply source (not shown) and a nitrogen-gas on-off valve 102 that is provided in the nitrogen-gas supplying pipe 101.

According to the gasifier 10 of the thus-configured IGCC 1A, because the gas supplying passage 11, which guides generated combustible gas to the char recovery unit 30, and the oxygen level adjusting section 100, which supplies nitrogen gas to the gas supplying passage 11, are provided, the level of oxygen in the combustible gas generated in the gasifier 10 can be adjusted by mixing an appropriate amount of nitrogen gas thereinto. Specifically, the oxygen level adjusting section 100 can reduce the level of oxygen in the gas to an ignition limit or lower by mixing nitrogen gas at an upstream side of the flare facility 90.

As a result, when the gasifier 10 is started-up, the level of oxygen in gas is reduced to the ignition limit or lower, thereby making it possible to prevent char from being combusted even though the gas is supplied to the porous filter 32. Specifically, char, which causes black smoke, is removed, thus making it possible to supply the gas to the porous filter 32 in the same way as the normal operation.

In the above-described IGCC 1A, when the gasifier 10 is started-up, the following start-up method is adopted.

Specifically, a start-up method for the gasifier 10 in the IGCC 1A of the second embodiment includes an oxygen-level reducing step of reducing the level of oxygen in gas to the ignition limit or lower by mixing nitrogen gas, which is inert gas, into the combustible gas generated in the gasifier 10, at the upstream side of the flare facility 90. Thus, even when combustible gas in which the level of oxygen has been reduced to the ignition limit or lower is supplied to the porous filter 32, it is possible to prevent char from being combusted, and thus char, which causes black smoke, is removed, thus making it possible to supply the gas to the porous filter 32 in the same way as the normal operation.

Even though the configuration and the start-up method of the second embodiment are adopted, at the time of ignition in the coal gasifier 10, combustible gas (oxygen-containing gas) can be supplied to the porous filter 32, char in the gas can be removed with the porous filter 32, and therefore, the pipe passage of the bypass main passage 91 from the point A to the point B is unnecessary. Specifically, not only the pipe passage of the bypass main passage 91 from the point A to the point B but also the passage inlet on-off valve 92 and the dust collector 93 are unnecessary, and furthermore, the passage inlet on-off valve 12 in the combustible gas supplying system 11 is also unnecessary.

In this way, according to the above-described embodiments, it is possible to provide the gasifier 10, which makes it possible to prevent or inhibit the temporary occurrence of black smoke when the gasifier is started-up. Specifically, because char can be removed by supplying oxygen-containing gas generated from the gasifier 10 to the porous filter 32 and an existing dust collecting facility 110, the temporary occurrence of black smoke can be prevented or inhibited even in the operation performed when the gasifier is started-up.

Then, in the IGCC 1 or 1A, which is provided with the coal gasifier 10 for gasifying coal, because it is possible to prevent or inhibit the temporary occurrence of black smoke from the flare facility 90 when the gasifier is started-up, a facility having excellent emission levels can be provided.

Note that the present invention is not limited to the above-described embodiments and can be appropriately changed without departing from the scope thereof.

REFERENCE SIGNS LIST

1, 1A integrated gasification combined cycle facility (IGCC)
10 coal gasifier
11 combustible gas supplying system (gas supplying passage)
12, 92 passage inlet on-off valve
20 coaling equipment
30 char recovery unit
31 cyclone
32 porous filter
40 gas purification facility
50 gas turbine facility
55 air supply passage
56 airflow control valve
60 heat recovery steam generator (HRSG)
70 steam turbine
80 air separation unit (ASU)
81 inert-gas supplying passage
82 inert-gas flow control valve
83 oxygen supplying passage
84 oxygen flow control valve
90 flare facility
91 bypass main passage
100 oxygen level adjusting section
BS start-up burner
CU flow control unit

The invention claimed is:

1. A gasifier start-up method for a gasifier in which a gasifying agent and a solid carbonaceous fuel are supplied and gasified, the gasifier including:
   a gas supplying passage that guides generated combustible gas to a char recovery unit;
   a start-up burner in which a start-up fuel and oxygen-containing gas are supplied and ignited;
   an inert gas supplying passage that has an inert-gas flow control valve supplying inert gas to the gasifier provided with the start-up burner;
   an oxygen supplying passage that has an oxygen flow control valve supplying oxygen to the gasifier;
   an air supply passage that has an airflow control valve supplying air to the gasifier; and
   a flow control unit for the inert-gas flow control valve, the oxygen flow control valve, and the airflow control valve, wherein the flow control unit performs flow control by opening the inert-gas flow control valve and performs flow control by closing the oxygen flow control valve and the airflow control valve at the time of ignition in the gasifier such that combustion gas obtained after combustion reaction of the start-up fuel and the oxygen-containing gas becomes insert gas, and wherein the start-up fuel supplied to the start-up burner together with the oxygen-containing gas is ignited in the gasifier under inert atmosphere in which the insert gas is supplied from the inert gas supplying passage, the start-up method comprising:

a start-up burner igniting step of supplying a start-up fuel and oxygen-containing gas to the start-up burner and igniting the start-up fuel and the oxygen-containing gas under an inert atmosphere in which an inside of the gasifier around the start-up burner is filled with inert gas; and an oxygen-containing-gas supply adjusting step of adjusting supply of the oxygen-containing gas such that combustion gas obtained after a combustion reaction of the start-up fuel and the oxygen-containing gas becomes the inert gas, which contains little oxygen.

2. A gasifier start-up method according to claim 1, wherein an air ratio in the start-up burner igniting step under the inert atmosphere falls within a range from 0.7 to 1.1.

3. A gasifier in which a gasifying agent and a solid carbonaceous fuel are supplied and gasified, the gasifier comprising:

a gas supplying passage that guides generated combustible gas to a char recovery unit;

a start-up burner in which a start-up fuel and oxygen-containing gas are supplied and ignited;

an inert gas supplying passage that has an inert-gas flow control valve supplying inert gas to the gasifier provided with the start-up burner;

an oxygen supplying passage that has an oxygen flow control valve supplying oxygen to the gasifier;

an air supply passage that has an airflow control valve supplying air to the gasifier; and a flow control unit for the inert-gas flow control valve, the oxygen flow control valve, and the airflow control valve, wherein the flow control unit performs flow control by opening the inert-gas flow control valve and performs flow control by closing the oxygen flow control valve and the airflow control valve at the time of ignition in the gasifier such that combustion gas obtained after combustion reaction of the start-up fuel and the oxygen-containing gas becomes insert gas, and wherein the start-up fuel supplied to the start-up burner together with the oxygen-containing gas is ignited in the gasifier under inert atmosphere in which the insert gas is supplied from the inert gas supplying passage.

4. An integrated gasification combined cycle facility in which a gas turbine facility is driven to generate power by using, as a fuel, combustible gas obtained by gasifying coal in a gasifier according to claim 3, and a steam turbine is driven to generate power by using steam generated by recovering heat from combustion exhaust gas discharged from the gas turbine facility.

* * * * *